(12) United States Patent
Yonezawa

(10) Patent No.: US 11,572,903 B2
(45) Date of Patent: Feb. 7, 2023

(54) PNEUMATIC CYLINDER DEVICE WITH HOLDING VALVE

(71) Applicant: KOSMEK LTD., Kobe (JP)

(72) Inventor: Keitaro Yonezawa, Kobe (JP)

(73) Assignee: KOSMEK LTD., Kobe (JP)

( * ) Notice: Subject to any disclaimer, the term of this patent is extended or adjusted under 35 U.S.C. 154(b) by 0 days.

(21) Appl. No.: 17/415,765

(22) PCT Filed: Jan. 30, 2020

(86) PCT No.: PCT/JP2020/003436
§ 371 (c)(1),
(2) Date: Jun. 18, 2021

(87) PCT Pub. No.: WO2020/162318
PCT Pub. Date: Aug. 13, 2020

(65) Prior Publication Data
US 2022/0074436 A1    Mar. 10, 2022

(30) Foreign Application Priority Data
Feb. 6, 2019  (JP) .............. JP2019-019844

(51) Int. Cl.
*F15B 15/26* (2006.01)
*F16K 11/22* (2006.01)

(52) U.S. Cl.
CPC .............. *F15B 15/26* (2013.01); *F16K 11/22* (2013.01)

(58) Field of Classification Search
CPC .......... F16K 17/04; F16K 11/22; F15B 13/01; F15B 11/003; F15B 15/26
See application file for complete search history.

(56) References Cited

U.S. PATENT DOCUMENTS

2018/0180189 A1*  6/2018  Bell .................... F15B 13/0401

FOREIGN PATENT DOCUMENTS

| DE | 1993-4480 A1 | 7/1999 |
|---|---|---|
| DE | 2020-04007738 U1 | 8/2004 |
| DE | 2020-04019495 U1 | 4/2005 |
| JP | 2524688 Y2 | 11/1996 |

OTHER PUBLICATIONS

Search Report dated Dec. 9, 2021, issued in corresponding European application No. 20 752 552.8.
Search Report dated Apr. 7, 2020, issued in corresponding International application No. PCT/JP2020/003436.

* cited by examiner

*Primary Examiner* — Abiy Teka
*Assistant Examiner* — Daniel S Collins
(74) *Attorney, Agent, or Firm* — Bacon & Thomas, PLLC

(57) ABSTRACT

An output member (7) is inserted in a housing (5) so as to be movable in a left-right direction. A lock chamber (20) is provided to the right of the output member (7), as a first actuation chamber. Compressed air is supplied to and discharged from the lock chamber (20) through a first supply and discharge passage (24) provided in the housing (5). A first holding valve (30) provided to an intermediate portion of the first supply and discharge passage (24) is configured to close and open the first supply and discharge passage (24).

3 Claims, 11 Drawing Sheets

PNEUMATIC CYLINDER DEVICE WITH HOLDING VALVE

TECHNICAL FIELD

The present invention relates to a pneumatic cylinder device including a holding valve.

BACKGROUND ART

Known examples of such a fluid pressure cylinder device with a holding valve include a hydraulic cylinder device described in Patent Literature 1 (Japanese Utility Model No. 2524688). The known device is structured as follows.

A cylinder hole is provided in a housing. A piston is inserted in the cylinder hole so as to be movable. A lock chamber is provided to the right of the piston. A supply and discharge passage through which pressurized oil is supplied to and discharged from the lock chamber is provided in the housing. A holding valve is attached to an intermediate portion of the supply and discharge passage. The holding valve is configured to close and open the supply and discharge passage. If the supply of pressurized oil to the lock chamber is stopped for some reason while the hydraulic cylinder device is in a lock state, the holding valve is closed by the pressure of pressurized oil in the lock chamber.

CITATION LIST

Patent Literature

Patent Literature 1: Japanese Utility Model No. 2524688

SUMMARY OF INVENTION

Technical Problem

The above-described known device has however the following disadvantage.

Suppose that the hydraulic cylinder device is left for a long period of time in the above state in which the supply of pressurized oil to the actuation chamber (the lock chamber) is stopped. Because the compressibility of oil is smaller than that of air, the pressure in the actuation chamber drops if only a slight amount of pressurized oil leaks from the actuation chamber to the outside, leading to a decrease in clamping force.

An object of the present invention is to provide a fluid pressure cylinder device capable of maintaining an operational state for a long period of time while supply of fluid to an actuation chamber of the cylinder device is stopped.

Solution to Problem

In order to achieve the above object, in a first aspect of the present invention, a pneumatic cylinder device is structured as follows, as shown in FIG. 1A to FIG. 2C, FIG. 3 and FIG. 4, FIG. 5 and FIG. 6, and FIG. 7A and FIG. 7B, for example.

An output member 7 is inserted in a housing 5 so as to be movable in its axial direction. A first actuation chamber 20 is provided on a base end side in the axial direction of the output member 7. A second actuation chamber 21 is provided on a leading end side in the axial direction of the output member 7. Through a first supply and discharge passage 24 provided in the housing 5, compressed air is supplied to and discharged from the first actuation chamber 20. Through a second supply and discharge passage 26 provided in the housing 5, compressed air is supplied to and discharged from the second actuation chamber 21. A first holding valve 30 provided to an intermediate portion of the first supply and discharge passage 24 is configured to close and open the first supply and discharge passage 24. The first holding valve 30 is structured as follows. A first casing 32 of the first holding valve 30 is attached in a first attachment hole 31 provided in the housing 5. A first valve hole 33 is provided in the first casing 32. A first valve seat 34 is provided on an inner peripheral wall of the first valve hole 33. A first valve member 35 inserted in the first valve hole 33 so as to be movable is biased by a first valve-closing spring 38 toward the first valve seat 34. A first operation member 39 is hermetically inserted in a portion of the first valve hole 33 so as to be movable, the portion being opposite to the first valve member 35 across the first valve seat 34. The first operation member 39 is opposed to the first valve member 35 with a predetermined gap therebetween so as to be contactable with the first valve member 35. A first pressure-receiving chamber 41 is provided close to a first end surface of the first operation member 39, the first end surface being opposite from a second end surface thereof facing the first valve member 35. A first communication passage 44 communicatively connects the second actuation chamber 21 to the first pressure-receiving chamber 41.

In the first aspect, the following functions and effects are provided.

In the pneumatic cylinder device of this aspect, air (compressed air) having a larger compressibility than that of oil is used as operating fluid. Due to this, in the pneumatic cylinder device of this aspect, even if compressed air contained in the first actuation chamber by the first holding valve leaks little by little to the outside of the first actuation chamber, decrease in pressure in the actuation chamber is smaller than that in hydraulic cylinder devices; or even if the temperature of compressed air drops, the decrease in pressure is smaller. It is therefore possible to maintain an operational state for a long period of time as compared to known hydraulic cylinder devices.

Furthermore, when supply of compressed air to the first actuation chamber of the above-described pneumatic cylinder device is stopped for some reason under the situation in which compressed air has been supplied to the first actuation chamber, the first holding valve is closed by the pressure of the compressed air in the first actuation chamber and by the biasing force of the first valve-closing spring. This reliably maintains the pressure level of the compressed air in the first actuation chamber. As a result, the pressure of compressed air in the first actuation chamber pushes the output member, and therefore the operational state of the pneumatic cylinder device at the time when the supply of compressed air stops can be maintained for a long period of time.

It is preferable to incorporate the following features (1) and (2) into the first aspect of the invention.

(1) A holding spring 22 is attached in the first actuation chamber 20 and between the output member 7 and a base end wall 5a of the housing 5.

In this case, when supply of compressed air to the first actuation chamber of the pneumatic cylinder device is stopped for some reason under the situation in which compressed air has been supplied to the first actuation chamber, the first holding valve is closed by the pressure of the compressed air in the first actuation chamber and by the biasing force of the first valve-closing spring. This reliably maintains the pressure level of the compressed air in the first actuation chamber. As a result, the pressure of compressed air in the first actuation chamber and the biasing force of the holding spring push the output member, and therefore the operational state of the pneumatic cylinder device at the time when the supply of compressed air stops can be maintained for a long period of time.

(2) As shown in FIGS. 3 and 4, for example, a second holding valve 50 provided to an intermediate portion of the second supply and discharge passage 26 is configured to close and open the second supply and discharge passage 26. The second holding valve 50 is structured as follows. A second casing 52 of the second holding valve 50 is attached in a second attachment hole 51 provided in the housing 5. A second valve hole 53 is provided in the second casing 52. A second valve seat 54 is provided on an inner peripheral wall of the second valve hole 53. A second valve member 55 inserted in the second valve hole 53 so as to be movable is biased by a second valve-closing spring 58 toward the second valve seat 54. A second operation member 59 hermetically inserted in a portion of the second valve hole 53 so as to be movable, the portion being opposite to the second valve member 55 across the second valve seat 54, is opposed to the second valve member 55 with a predetermined gap therebetween so as to be contactable with the second valve member 55. A second pressure-receiving chamber 61 is provided close to a first end surface of the second operation member 59, the first end surface being opposite from a second end surface thereof facing the second valve member 55. A second communication passage 64 communicatively connects the first actuation chamber 20 to the second pressure-receiving chamber 61.

In this pneumatic cylinder device, air (compressed air) having a larger compressibility than that of oil is used as operating fluid. Due to this, in the thus arranged pneumatic cylinder device, even if compressed air contained in the second actuation chamber by the second holding valve leaks little by little to the outside of the second actuation chamber, decrease in pressure in the actuation chamber is smaller than that in hydraulic cylinder devices; or even if the temperature of compressed air drops, the decrease in pressure is smaller. It is therefore possible to maintain an operational state for a long period of time as compared to known clamping apparatuses including hydraulic cylinder devices.

Furthermore, when supply of compressed air to the second actuation chamber of the pneumatic cylinder device is stopped for some reason under the situation in which compressed air has been supplied to the second actuation chamber, the second holding valve is closed by the pressure of the compressed air in the second actuation chamber and by the biasing force of the second valve-closing spring. This reliably maintains the pressure level of the compressed air in the second actuation chamber. As a result, the pressure of compressed air in the second actuation chamber pushes the output member against the biasing force of the holding spring, and therefore the operational state of the pneumatic cylinder device at the time when the supply of compressed air stops can be maintained for a long period of time.

In order to achieve the above object, in a second aspect of the present invention, a pneumatic cylinder device is structured as follows.

An output member 7 is inserted in a housing 5 so as to be movable in its axial direction. A first actuation chamber 20 is provided on a base end side in the axial direction of the output member 7. A second actuation chamber 21 is provided on a leading end side in the axial direction of the output member 7. Through a first supply and discharge passage 24 provided in the housing 5, compressed air is supplied to and discharged from the first actuation chamber 20. Through a second supply and discharge passage 26 provided in the housing 5, compressed air is supplied to and discharged from the second actuation chamber 21. A second holding valve 50 provided to an intermediate portion of the second supply and discharge passage 26 is configured to close and open the second supply and discharge passage 26. The second holding valve 50 is structured as follows. A second casing 52 of the second holding valve 50 is attached in a second attachment hole 51 provided in the housing 5. A second valve hole 53 is provided in the second casing 52. A second valve seat 54 is provided on an inner peripheral wall of the second valve hole 53. A second valve member 55 inserted in the second valve hole 53 so as to be movable is biased by a second valve-closing spring 58 toward the second valve seat 54. A second operation member 59 is hermetically inserted in a portion of the second valve hole 53 so as to be movable, the portion being opposite to the second valve member 55 across the second valve seat 54. The second operation member 59 is opposed to the second valve member 55 with a predetermined gap therebetween so as to be contactable with the second valve member 55. A second pressure-receiving chamber 61 is provided close to a first end surface of the second operation member 59, the first end surface being opposite from a second end surface thereof facing the second valve member 55. A second communication passage 64 communicatively connects the first actuation chamber 20 to the second pressure-receiving chamber 61.

In this pneumatic cylinder device, air (compressed air) having a larger compressibility than that of oil is used as operating fluid. Due to this, even if compressed air contained in the second actuation chamber by the second holding valve leaks little by little to the outside of the second actuation chamber, decrease in pressure in the actuation chamber is smaller than that in hydraulic cylinder devices; or even if the temperature of compressed air drops, the decrease in pressure is smaller. It is therefore possible to maintain an operational state for a long period of time as compared to known clamping apparatuses including hydraulic cylinder devices.

Furthermore, when supply of compressed air to the second actuation chamber of the above-described pneumatic cylinder device is stopped for some reason under the situation in which compressed air has been supplied to the second actuation chamber, the second holding valve is closed by the pressure of the compressed air in the second actuation chamber and by the biasing force of the second valve-closing spring. This reliably maintains the pressure level of the compressed air in the second actuation chamber. As a result, the pressure of compressed air in the second actuation chamber pushes the output member, and therefore the operational state of the pneumatic cylinder device at the time when the supply of compressed air stops can be maintained for a long period of time.

DESCRIPTION OF EMBODIMENTS

Figure 1A:
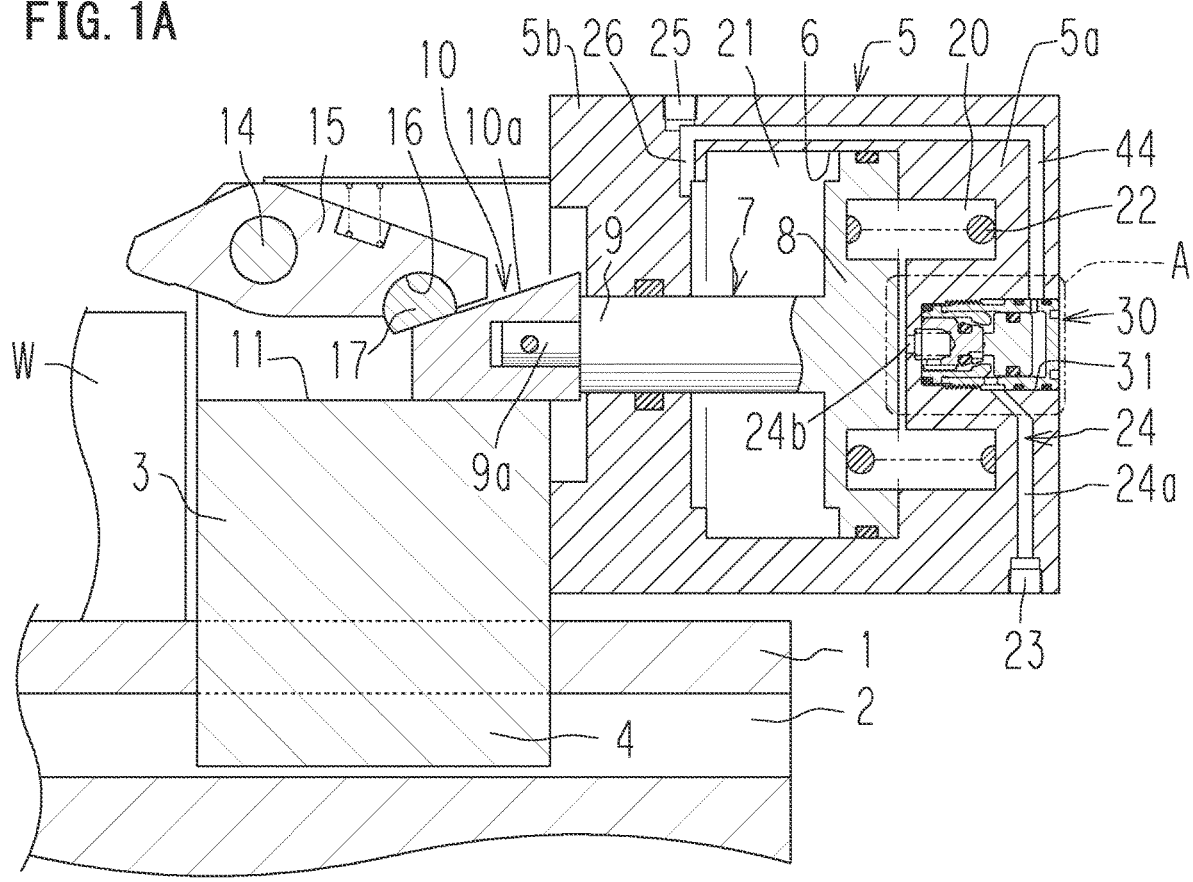
FIG. 1A shows a first embodiment of the present invention, and is a schematic cross-sectional view of a clamping apparatus in a release state.

The following describes a first embodiment of the present invention with reference to FIG. 1A to FIG. 2C. This embodiment deals with a case in which a pneumatic cylinder device of the present invention is applied to a clamping apparatus, by way of example.

A T-groove 2 extending in a left-right direction is provided at an upper portion of a stationary stand 1. Along the T-groove 2, a movable member 3 is movable in the left-right direction. The movable member 3 has a T-leg 4, which is inserted in the T-groove 2. A housing 5 is fixed, in a lateral position, to the movable member 3. A cylinder hole 6 is provided inside the housing 5. An output member 7 is inserted in the cylinder hole 6 so as to be movable in the left-right direction (in its axial direction). The output member 7 includes a piston 8 and an output rod 9, which are provided from right to left in this order. A wedge member 10 attached to a leading end portion 9a of the output rod 9 is guided in the left-right direction on a guide surface 11 provided on an upper portion of the movable member 3. A pin 14 is provided to protrude in a horizontal direction from the upper portion of the movable member 3. A clamp arm 15 is rotatable about the pin 14. The clamp arm 15 has a hemispherical recess 16 at its lower right portion. A spherical portion of a hemispherical transmission member 17 is inserted in the recess 16, while a flat surface of the transmission member 17 is engaged with a wedge surface 10a of the wedge member 10. The transmission member 17 of this embodiment may have another shape such as a cylindrical shape, instead of the hemispherical shape.

The piston 8 of the output member 7 is hermetically inserted in the cylinder hole 6 so as to be movable in the left-right direction. In the cylinder hole 6, a lock chamber (a first actuation chamber) 20 is provided to the right of the piston 8. Meanwhile, a release chamber (a second actuation chamber) 21 is provided to the left of the piston 8. In the lock chamber 20, a holding spring 22 is attached between the piston 8 and a right wall (base end wall) 5a of the housing 5. The holding spring 22 biases the piston 8 leftward relative to the housing 5.

A first supply and discharge port 23 is provided at a lower right portion of the housing 5. A first supply and discharge passage 24 which communicatively connects the first supply and discharge port 23 to the lock chamber 20 is provided in the right wall (base end wall) 5a of the housing 5. Through the first supply and discharge passage 24, compressed air is supplied to and discharged from the lock chamber 20. A second supply and discharge port 25 is provided at an upper left portion of the housing 5. A second supply and discharge passage 26 which communicatively connects the second supply and discharge port 25 to the release chamber 21 is provided in a left wall (leading end wall) 5b of the housing 5. Through the second supply and discharge passage 26, compressed air is supplied to and discharged from the release chamber 21. A first holding valve 30 is provided at an intermediate portion of the first supply and discharge passage 24. The first holding valve 30 is configured to close and open the first supply and discharge passage 24.

Figure 1B:
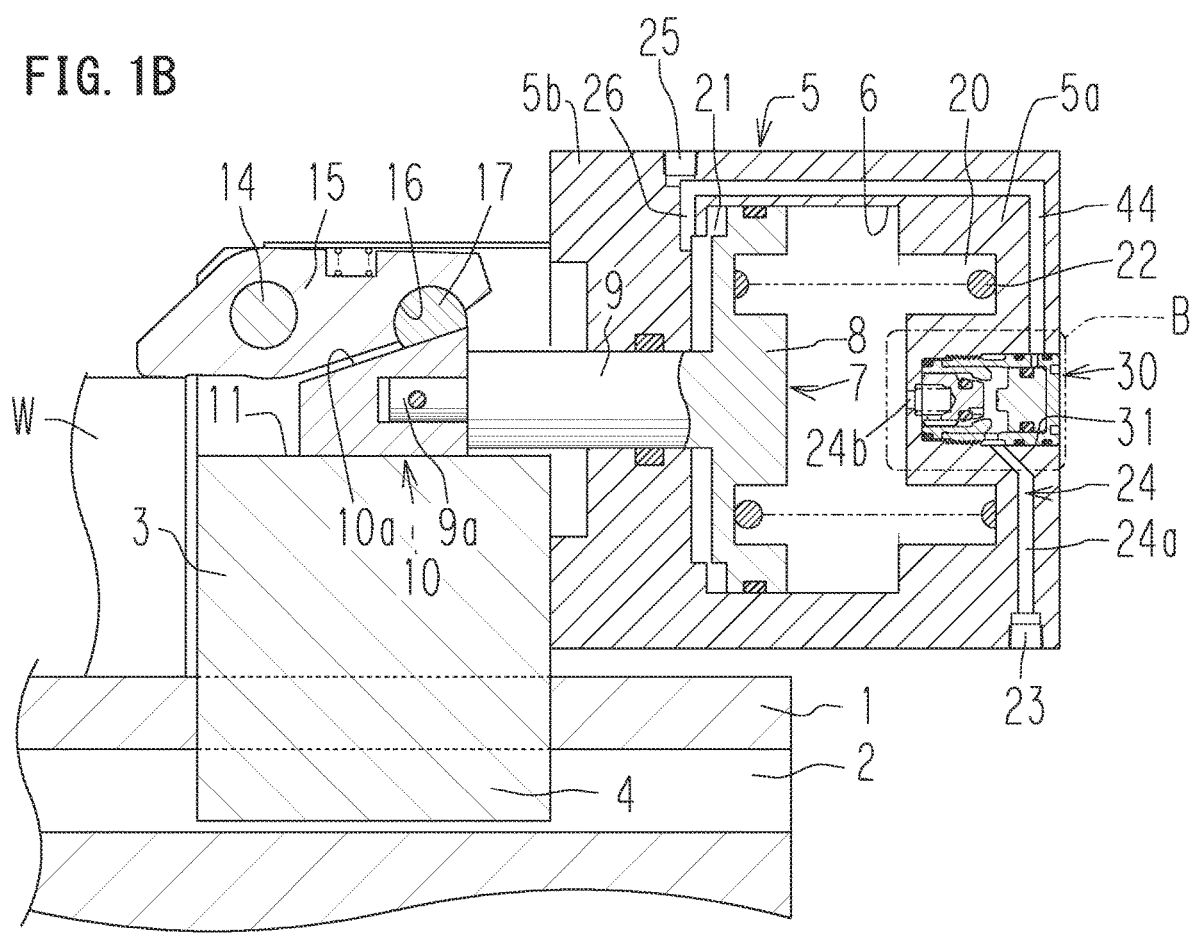
FIG. 1B is a schematic cross-sectional view of the clamping apparatus in a lock state.
Figure 2A:
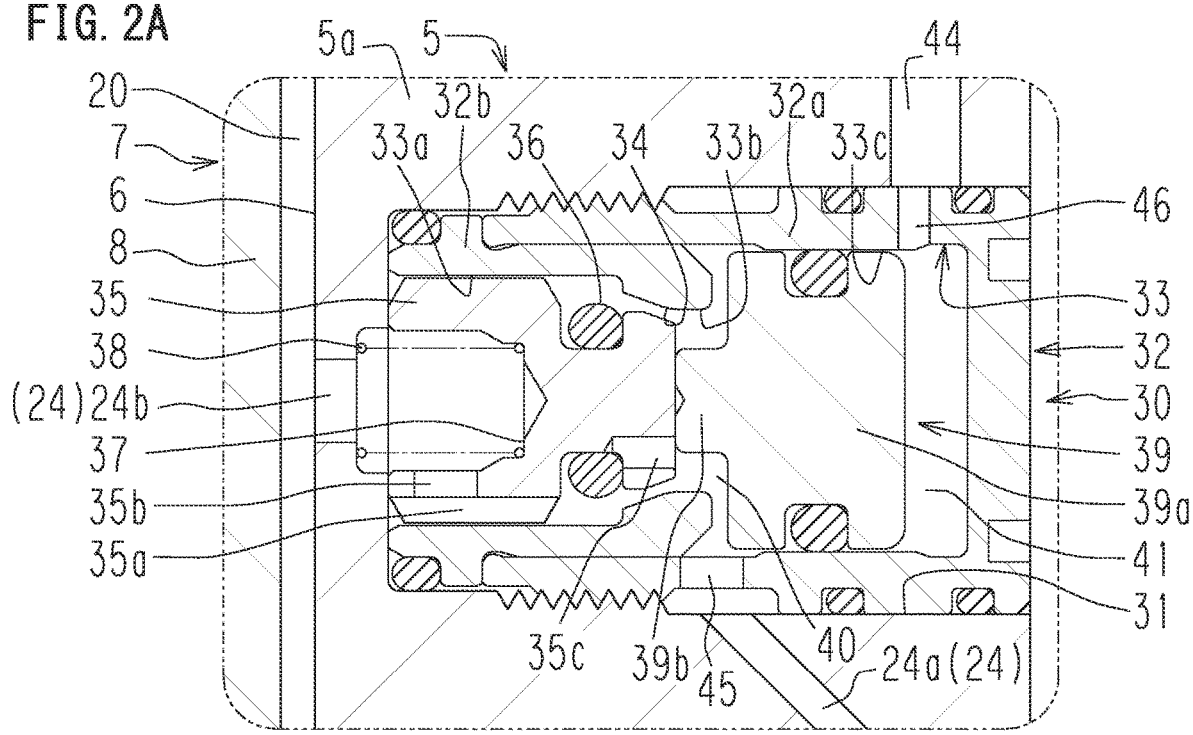
FIG. 2A is an enlarged view of a part A in FIG. 1A, and is a diagram illustrating a first holding valve provided in the clamping apparatus.
Figure 2B:
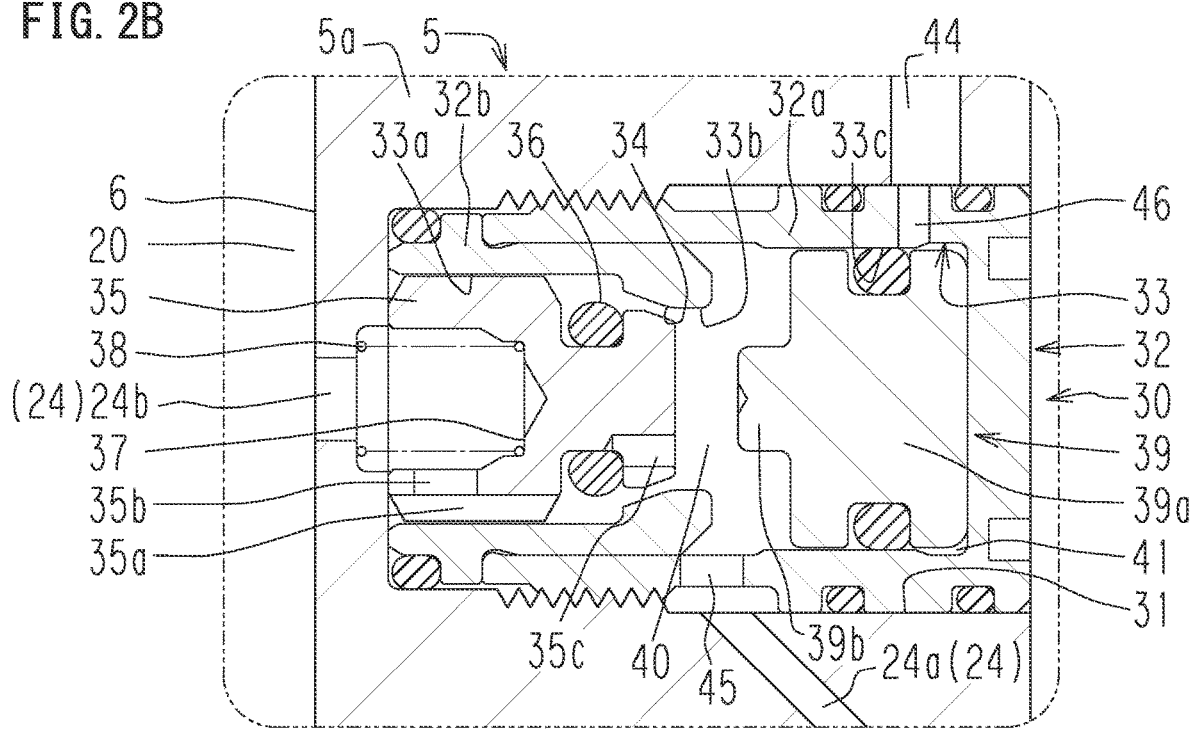
FIG. 2B is an enlarged view of a part B in FIG. 1B, and is a diagram illustrating the first holding valve provided in the clamping apparatus.
Figure 2C:
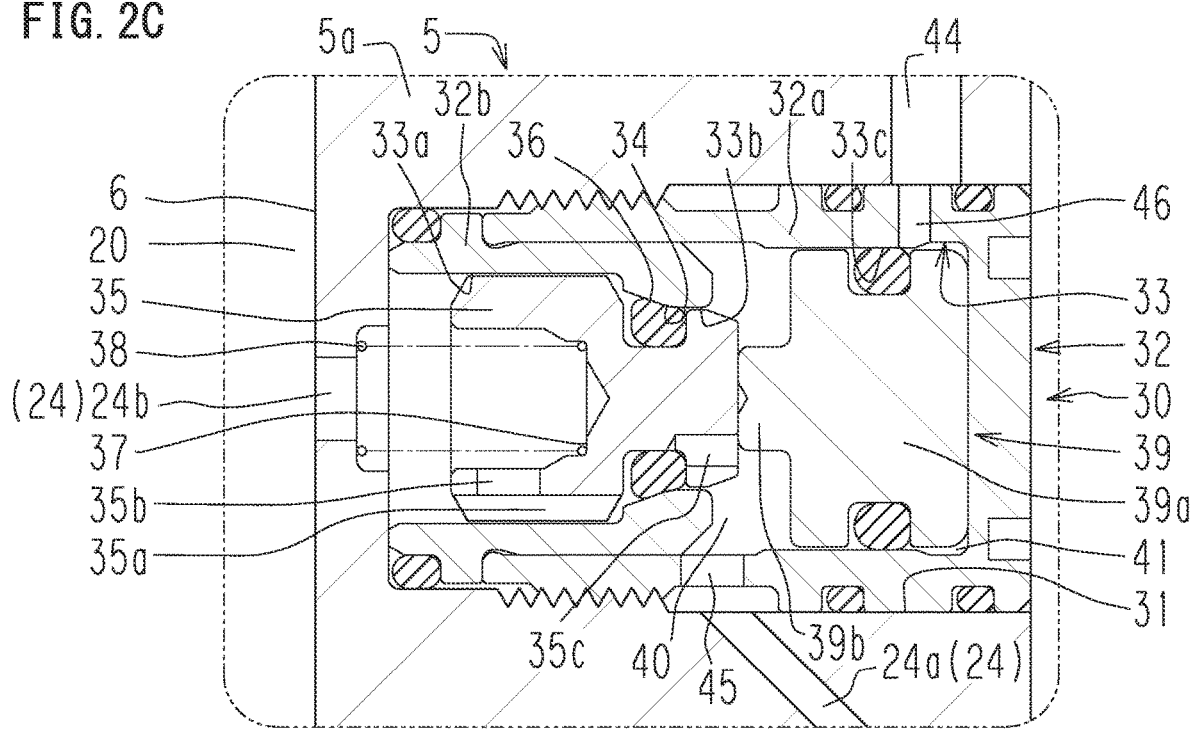
FIG. 2C is a diagram similar to FIG. 2A, and is a diagram illustrating a closed state of the first holding valve of the clamping apparatus.

The first holding valve 30 is structured as follows, as shown in FIG. 2A to FIG. 2C (and FIG. 1A, FIG. 1B).

A first attachment hole 31 extending in the left-right direction is provided in the right wall 5a of the housing 5. A first casing 32 of the first holding valve 30 is screwed to an internal thread portion of the first attachment hole 31. The first casing 32 includes: a tubular casing main body 32a; and a tubular leading-end-side member 32b fixed to a left end portion of the casing main body 32a. Before the first holding valve 30 is screwed to the first attachment hole 31, the leading-end-side member 32b is pressed into the tubular hole of the tubular casing main body 32a, and the left end portion of the casing main body 32a is fitted in a recess provided on an outer peripheral wall of the leading-end-side member 32b. The leading-end-side member 32b is thus fixed to the casing main body 32a. A first valve hole 33 extending in the left-right direction is provided inside the first casing 32. The first valve hole 33 has a middle-diameter hole 33a, a small-diameter hole 33b, and a large-diameter hole 33c, which are arranged in this order from left to right. A first valve seat 34 is provided at a narrowing portion between the middle-diameter hole 33a and the small-diameter hole 33b. The first valve seat 34 is designed so as to taper down rightward. A first valve member 35 is inserted in the middle-diameter hole 33a so as to be movable in the left-right direction. A groove is provided on an outer peripheral wall of the first valve member 35 in its circumferential direction. An O ring functioning as a sealing member is attached to the groove. An outer peripheral portion of the O ring structures a first valve surface 36. The first valve surface 36 is configured to be contactable with the first valve seat 34. A first valve-closing spring 38 is attached between a bottom surface of a recess 37 provided on the first valve member 35 and a bottom surface of the first valve hole 33. The first valve-closing spring 38 biases the first valve member 35 toward the first valve seat 34. A communication groove 35a is provided in the left-right direction on an outer peripheral wall of the first valve member 35. A through hole 35b is provided in the first valve member 35 to communicatively connect the communication groove 35a to the recess 37. A pressure releasing hole 35c, opening onto a right end surface of the first valve member 35, opens also to a peripheral wall of the circumferential groove provided on the first valve member 35. The opening of the pressure releasing hole 35c on the groove is sealed by the O ring functioning as the sealing member.

A first operation member 39 is hermetically inserted in the large-diameter hole 33c (a portion of the first valve hole 33, which is opposite to the first valve member 35 across the first valve seat 34) so as to be movable in the left-right direction. The first operation member 39 includes a main body 39a and a protruding portion 39b provided to protrude toward the first valve member 35. The first operation member 39 is opposed to the first valve member 35 with a predetermined gap therebetween so that a left end surface of the protruding portion 39b is contactable with a right end surface of the first valve member 35. In the large-diameter hole 33c, a first valve chamber 40 is provided to the left of the first operation member 39, while a first pressure-receiving chamber 41 is provided to the right of the first operation member 39 (i.e., provided close to a first end surface of the first operation member 39, which is opposite from its second end surface facing the first valve member 35). The first pressure-receiving chamber 41 and the release chamber 21 are communicatively connected to each other by a first communication passage 44 and by a through hole 46 provided through a peripheral wall of the first casing 32.

A through hole 45 is provided through the peripheral wall of the first casing 32. The through hole 45 communicatively connects the first valve chamber 40 provided to the left of the first operation member 39 to a compressed-air-source-side passage 24a of the first supply and discharge passage 24. Meanwhile, a lock-chamber-side passage 24b of the first supply and discharge passage 24 is communicatively connected to the middle-diameter hole 33a of the first valve hole 33. In this embodiment, the through hole 45, the first valve hole 33, the communication groove 35a, the through hole 35b, the pressure releasing hole 35c, the recess 37, and the like constitute a part of the first supply and discharge passage 24.

The above-described clamping apparatus operates as follows, as shown in FIG. 1 to FIG. 2C.

In an initial state (release state) shown in FIG. 1A, compressed air from a compressed air source has been supplied to the release chamber 21 through the second supply and discharge port 25 and through the second supply and discharge passage 26. In this state, compressed air supplied through the second supply and discharge passage 26 is supplied also to the first pressure-receiving chamber 41 of the first holding valve 30 via the first communication passage 44, as shown in FIG. 2A. As a result, compressed air in the first pressure-receiving chamber 41 moves the first operation member 39 leftward, and the first operation member 39 moves the first valve member 35 leftward away from the first valve seat 34. Therefore the first holding valve 30 is open. Consequently compressed air is discharged from the lock chamber 20 through the first supply and discharge passage 24. Due to this, compressed air in the release chamber 21 has moved the output member 7 to its right limit position against the leftward biasing force of the holding spring 22.

When the clamping apparatus is driven for locking action from the release state shown in FIG. 1A (and FIG. 2A) to the lock state shown in FIG. 1B (and FIG. 2B), compressed air in the release chamber 21 is discharged from the second supply and discharge port 25 to the outside through the second supply and discharge passage 26, and compressed air from the compressed air source is supplied to the first valve chamber 40 of the first holding valve 30 through the first supply and discharge port 23 and through the first supply and discharge passage 24. As a result, compressed air in the first valve chamber 40 moves the first valve member 35 leftward to open the first holding valve 30. Due to this, compressed air from the compressed air source is supplied to the lock chamber 20 through the first supply and discharge passage 24. Consequently, compressed air in the lock chamber 20 and the holding spring 22 move the piston 8 leftward, and the piston 8 moves the wedge member 10 leftward via the output rod 9. Subsequently, the wedge member 10 rotates the clamp arm 15 via the transmission member 17 in a counterclockwise direction about the pin 14. The clamp arm 15 presses a workpiece W from above. In this way, the clamping apparatus transitions from the release state to the lock state.

When the clamping apparatus is driven for releasing action from the lock state shown in FIG. 1B (and FIG. 2B) to the release state shown in FIG. 1A (and FIG. 2A), compressed air from the compressed air source is supplied to the release chamber 21 through the second supply and discharge passage 26, and to the first pressure-receiving chamber 41 of the first holding valve 30 through the first communication passage 44. As a result, compressed air in the first pressure-receiving chamber 41 moves the first operation member 39 leftward, and the first operation member 39 moves the first valve member 35 leftward away from the first valve seat 34. The first holding valve 30 is therefore opened, and compressed air in the lock chamber 20 is discharged to the outside through the first supply and discharge passage 24. There may be a case, however, in which the O ring is expanded radially outward by the pressure from the lock chamber 20 to fill a gap created between an outer peripheral surface of the first valve member 35 and the middle-diameter hole 33a of the first valve hole 33, and due to this, compressed air in the lock chamber 20 cannot be discharged to the outside even though the first operation member 39 moves the first valve member 35 leftward away from the first valve seat 34. In this case, compressed air in the lock chamber 20 is discharged to the outside through a gap created between an inner peripheral wall of the expanded O ring and the groove of the first valve member 35 and through the pressure releasing hole 35c. As a result, compressed air in the release chamber 21 moves the piston 8, the output rod 9, and the wedge member 10 rightward. Subsequently, the clamp arm 15 rotates in a clockwise direction due to the elastic restoring force of a spring. The clamp arm 15 moves away from the workpiece W. In this way, the clamping apparatus transitions from the lock state to the release state.

There may also be a case in which compressed air supplied from the compressed air source to the lock chamber 20 is stopped for some reason during the lock state. In this case, high-pressure compressed air in the lock chamber 20 tends to flow toward the outside, where the pressure is lower than that in the lock chamber 20, through the first supply and discharge passage 24. However, compressed air in the lock-chamber-side passage 24b and the first valve-closing spring 38 move the first valve member 35 rightward toward the first valve seat 34, to close the first holding valve 30. As a result, the clamping apparatus is held in the lock state by compressed air in the lock chamber 20, in which pressure is kept high, and by the holding spring 22.

The above-described embodiment provides the following functions and effects.

When the supply of compressed air to the lock chamber 20 is stopped for some reason during the lock state of the clamping apparatus, the first holding valve 30 is closed by the pressure of the compressed air in the lock chamber 20 and by the biasing force of the first valve-closing spring 38. This reliably maintains the pressure level of the compressed air in the lock chamber 20. As a result, the pressure of compressed air in the lock chamber 20 and the biasing force of the holding spring 22 push the piston 8 of the output member 7 leftward, and this allows the clamping apparatus to be held in the lock state for a long period of time.

Furthermore, the clamping apparatus of this embodiment includes the pneumatic cylinder device using air (compressed air) as operating fluid, the compressibility of which is larger than that of oil. Due to this, in the clamping apparatus of this embodiment, decrease in pressure is smaller than that in apparatuses using oil even if compressed air contained in the lock chamber 20 by the first holding valve 30 leaks little by little to the outside of the lock chamber 20, or even if the temperature of compressed air drops. It is therefore possible to maintain the lock state for a long period of time as compared to known clamping apparatuses including hydraulic cylinder devices.

Figure 3:
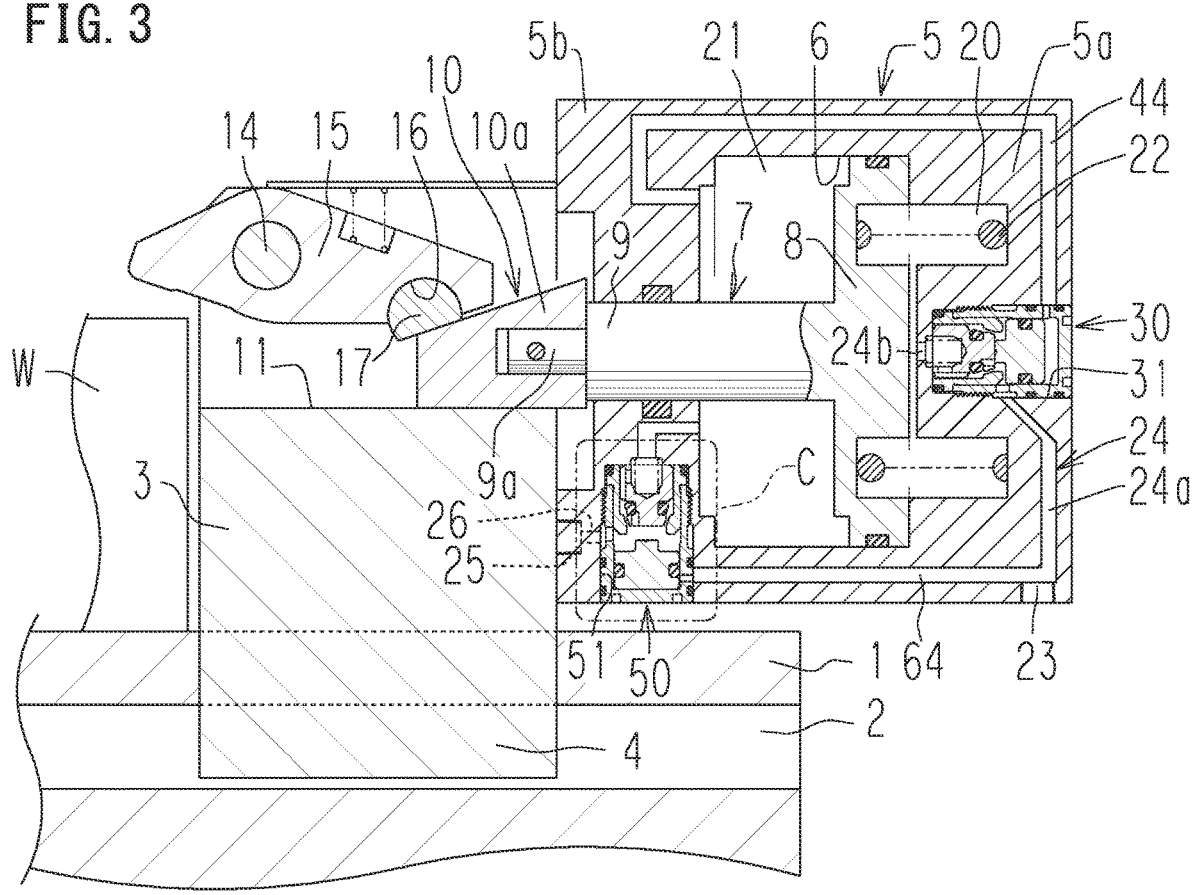
FIG. 3 shows a second embodiment of the present invention, and is a diagram similar to FIG. 1A.
Figure 4:
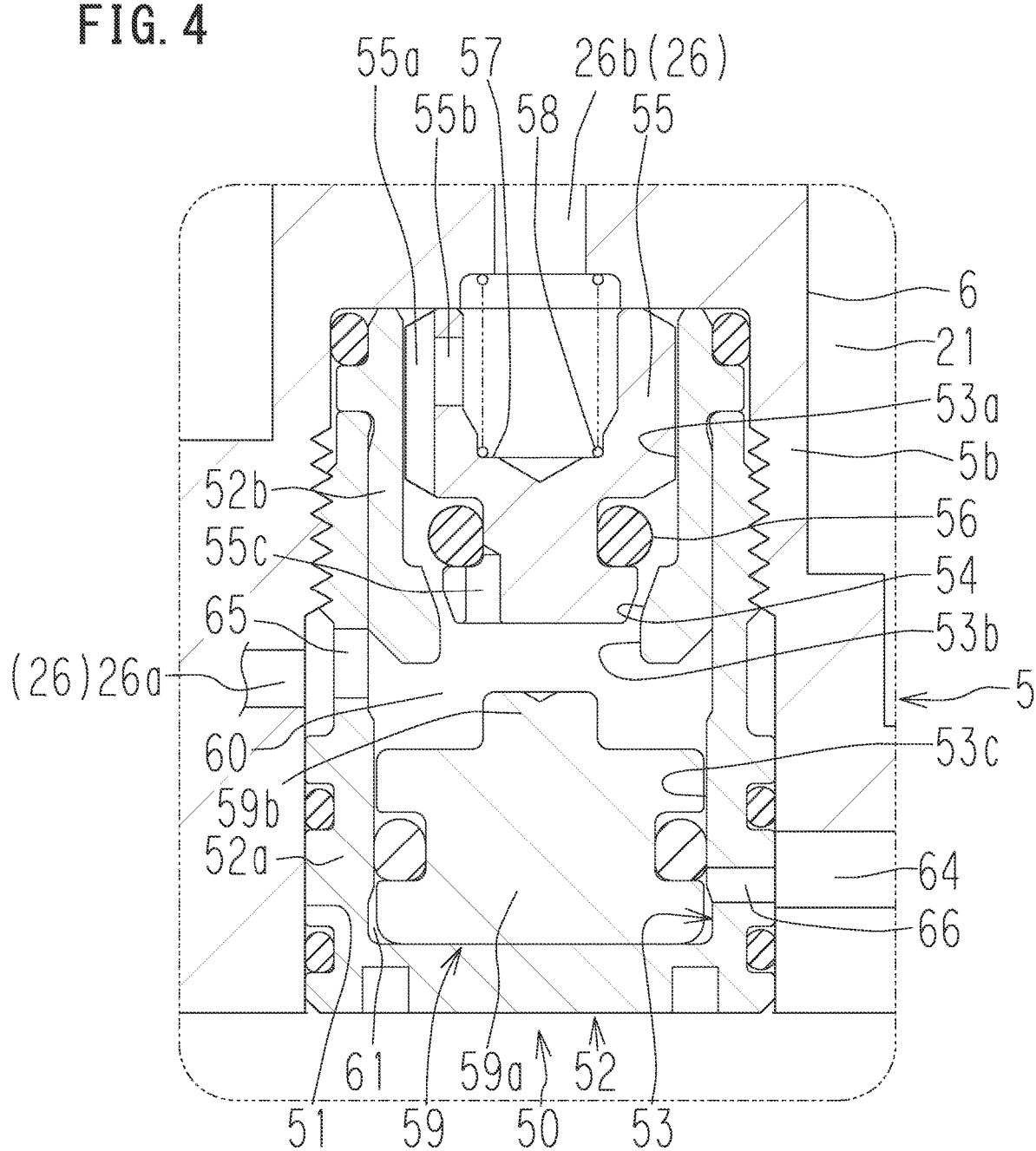
FIG. 4 is an enlarged view of a part C in FIG. 3, and is a diagram illustrating a second holding valve provided in the clamping apparatus.

FIG. 3 and FIG. 4, FIG. 5 and FIG. 6, and FIG. 7A and FIG. 7B show second to fourth embodiments of the present invention. In these embodiments, components the same as or similar to the components in the above-described first embodiment are given the same reference numerals, in principle. FIG. 3 and FIG. 4 show, by way of example, a clamping apparatus in which a pneumatic cylinder device of the second embodiment is applied.

The second embodiment shown in FIG. 3 and FIG. 4 is different from the first embodiment in the following points.

A second holding valve 50 is provided to an intermediate portion of the second supply and discharge passage 26. The second holding valve 50 is configured to close and open the second supply and discharge passage 26.

The second holding valve 50 has the structure the same as that of the first holding valve 30 of the first embodiment. The structure is described with reference to FIG. 3 and FIG. 4.

A second attachment hole 51 extending in the up-down direction is provided in a left wall 5b of the housing 5. A second casing 52 of the second holding valve 50 is screwed to an internal thread portion of the second attachment hole 51. The second casing 52 includes: a tubular casing main body 52a; and a tubular leading-end-side member 52b fixed to an upper end portion of the casing main body 52a. Before the first holding valve 30 is screwed to the first attachment hole 31, the leading-end-side member 32b is pressed into the tubular hole of the tubular casing main body 32a, and the upper end portion of the casing main body 52a is fitted in a recess provided on an outer peripheral wall of the leading-end-side member 52b. The leading-end-side member 52b is thus fixed to the casing main body 52a. A second valve hole 53 extending in the up-down direction is provided inside the second casing 52. The second valve hole 53 has a middle-diameter hole 53a, a small-diameter hole 53b, and a large-diameter hole 53c, which are arranged in this order from top to bottom. A second valve seat 54 is provided at a narrowing portion between the middle-diameter hole 53a and the small-diameter hole 53b. The second valve seat 54 is designed so as to taper down downward. A second valve member 55 is inserted in the middle-diameter hole 53a so as to be movable in the up-down direction. A groove is provided on an outer peripheral wall of the second valve member 55 in its circumferential direction. An O ring functioning as a sealing member is attached to the groove. An outer peripheral portion of the O ring structures a second valve surface 56. The second valve surface 56 is configured to be contactable with the second valve seat 54. A second valve-closing spring 58 is attached between a bottom surface of a recess 57 provided on the second valve member 55 and a bottom surface of the second valve hole 53. The second valve-closing spring 58 biases the second valve member 55 toward the second valve seat 54. A communication groove 55a is provided in the up-down direction on an outer peripheral wall of the second valve member 55. A through hole 55b is provided in the second valve member 55 to communicatively connect the communication groove 55a to the recess 57. A pressure releasing hole 55c, opening onto a right end surface of the second valve member 55, opens also to a peripheral wall of the circumferential groove provided on the second valve member 55. The opening of the pressure releasing hole 55c on the groove is sealed by the O ring functioning as the sealing member.

A second operation member 59 is hermetically inserted in the large-diameter hole 53c so as to be movable in the up-down direction. The second operation member 59 includes a main body 59a and a protruding portion 59b provided to protrude toward the second valve member 55. The second operation member 59 is opposed to the second valve member 55 with a predetermined gap therebetween so that an upper end surface of the protruding portion 59b is contactable with a lower end surface of the second valve member 55. In the large-diameter hole 53c, a second valve chamber 60 is provided above the second operation member 59 (i.e., provided close to its end surface facing the second valve member 55), while a second pressure-receiving chamber 61 is provided below the second operation member 59 (i.e., provided close to its end surface opposite from the end surface facing the second valve member 55). The second pressure-receiving chamber 61 and the lock chamber 20 are communicatively connected to each other by a second communication passage 64 and by a through hole 66 provided through a peripheral wall of the second casing 52.

As shown in FIG. 4, a through hole 65 is bored through the peripheral wall of the second casing 52. The through hole 65 communicatively connects the second valve chamber 60 provided above the second operation member 59 to a compressed-air-source-side passage 26a of the second supply and discharge passage 26. Meanwhile, a release-chamber-side passage 26b of the second supply and discharge passage 26 is communicatively connected to the middle-diameter hole 53a of the second valve hole 53. In this embodiment, the through hole 65, the second valve hole 53, the communication groove 55a, the through hole 55b, the pressure releasing hole 55c, the recess 57, and the like constitute a part of the second supply and discharge passage 26.

The above-described clamping apparatus operates as follows. Refer to FIG. 3 and FIG. 4 (and FIG. 2A to FIG. 2C).

In an initial state (release state) shown in FIG. 3, compressed air has been supplied to the release chamber 21 through the second supply and discharge passage 26, and also to the first pressure-receiving chamber 41 of the first holding valve 30 through the first communication passage 44. As a result, compressed air in the first pressure-receiving chamber 41 moves the first operation member 39 leftward, and the first operation member 39 moves the first valve member 35 leftward away from the first valve seat 34. Therefore the first holding valve 30 is open. Consequently compressed air is discharged from the lock chamber 20 through the first supply and discharge passage 24. Due to this, compressed air in the release chamber 21 has moved the piston 8 of the output member 7 to its right limit position against the leftward biasing force of the holding spring 22.

When the clamping apparatus is driven for locking action from the release state shown in FIG. 3 (and FIG. 4) to the lock state, compressed air is supplied to the lock chamber 20 through the first supply and discharge passage 24 and also to the second pressure-receiving chamber 61 of the second holding valve 50 through the second communication passage 64. As a result, compressed air in the second pressure-receiving chamber 61 moves the second operation member 59 upward, and the second operation member 59 moves the second valve member 55 upward away from the second valve seat 54. The second holding valve 50 is therefore opened, and compressed air in the release chamber 21 is discharged to the outside through the second supply and discharge passage 26. There may be a case, however, in which: the O ring of the second valve member 55 is expanded radially outward by the pressure from the release chamber 21 to fill a gap created between an outer peripheral surface of the second valve member 55 and the middle-diameter hole 53a of the second valve hole 53; and due to this, compressed air in the release chamber 21 cannot be discharged to the outside even though the second operation member 59 moves the second valve member 55 upward away from the second valve seat 54. In this case, compressed air in the release chamber 21 is reliably discharged to the outside through a gap created between an inner peripheral wall of the expanded O ring and the groove of the second valve member 55 and through the pressure releasing hole 55c. As a result, compressed air in the lock chamber 20 and the holding spring 22 move the piston 8, the output rod 9, and the wedge member 10 leftward. Subsequently, the wedge member 10 rotates the clamp arm 15 via the transmission member 17 in the counterclockwise direction about the pin 14. The clamp arm 15 presses a workpiece W from above. In this way, the clamping apparatus transitions from the release state to the lock state.

When the clamping apparatus is driven for releasing action from the lock state to the release state shown in FIG. 3 (and FIG. 4), compressed air from the compressed air source is supplied to the release chamber 21 through the second supply and discharge passage 26, and to the first pressure-receiving chamber 41 of the first holding valve 30 through the first communication passage 44. As a result, compressed air in the first pressure-receiving chamber 41 moves the first operation member 39 leftward, and the first operation member 39 moves the first valve member 35 leftward away from the first valve seat 34. The first holding valve 30 is therefore opened, and compressed air in the lock chamber 20 is discharged to the outside through the first supply and discharge passage 24. There may be a case, however, in which: the O ring is expanded radially outward by the pressure from the lock chamber 20 to fill the gap created between the outer peripheral surface of the first valve member 35 and the middle-diameter hole 33a of the first valve hole 33; and due to this, compressed air in the lock chamber 20 cannot be discharged to the outside even though the first operation member 39 moves the first valve member 35 leftward away from the first valve seat 34. In this case, compressed air in the lock chamber 20 is discharged to the outside through the gap created between the inner peripheral wall of the expanded O ring and the groove of the first valve member 35 and through the pressure releasing hole 35c. As a result, compressed air in the release chamber 21 moves the piston 8, the output rod 9, and the wedge member 10 rightward. Subsequently, the clamp arm 15 rotates in the clockwise direction due to the elastic restoring force of the spring. The clamp arm 15 moves away from the workpiece W. In this way, the clamping apparatus transitions from the lock state to the release state.

There may also be a case in which the supply of compressed air from the compressed air source to the lock chamber 20 is stopped for some reason during the lock state. In this case, high-pressure compressed air in the lock chamber 20 tends to flow toward the outside, where the pressure is lower than that in the lock chamber 20, through the first supply and discharge passage 24. However, the pressure of the compressed air in the lock-chamber-side passage 24b and the biasing force of the first valve-closing spring 38 move the first valve member 35 toward the first valve seat 34, to close the first holding valve 30. As a result, the clamping apparatus is held in the lock state by compressed air in the lock chamber 20, in which pressure is kept high, and by the holding spring 22.

There may also be a case in which the supply of compressed air from the compressed air source to the release chamber 21 is stopped for some reason during the release state. In this case, high-pressure compressed air in the release chamber 21 tends to flow toward the outside, where the pressure is lower than that in the release chamber 21, through the second supply and discharge passage 26. However, the pressure of the compressed air in the release-chamber-side passage 26b and the biasing force of the second valve-closing spring 58 move the second valve member 55 toward the second valve seat 54, to close the second holding valve 50. As a result, compressed air in the release chamber 21, in which pressure is kept high, pushes the output member 7 rightward against the leftward biasing force of the holding spring 22, and thereby the clamping apparatus is held in the release state.

The above-described embodiment provides the following advantages.

When the supply of compressed air to the lock chamber 20 is stopped for some reason during the lock state of the clamping apparatus, the first holding valve 30 is closed by the pressure of the compressed air in the lock chamber 20 and by the biasing force of the first valve-closing spring 38. This reliably maintains the pressure level of the compressed air in the lock chamber 20. As a result, the pressure of compressed air in the lock chamber 20 and the biasing force of the holding spring 22 push the piston 8 of the output member 7 leftward, and this allows the clamping apparatus to be held in the lock state for a long period of time.

Furthermore, when the supply of compressed air to the release chamber 21 is stopped for some reason during the release state of the clamping apparatus, the second holding valve 50 is closed by the pressure of compressed air in the release chamber 21 and by the biasing force of the second valve-closing spring 58. This reliably maintains the pressure level of the compressed air in the release chamber 21. As a result, the pressure of compressed air in the release chamber 21 pushes the piston 8 of the output member 7 rightward against the leftward biasing force of the holding spring 22, and this allows the clamping apparatus to be held in the release state for a long period of time.

Furthermore, the clamping apparatus of this embodiment includes the pneumatic cylinder device using air (compressed air) as operating fluid, the compressibility of which is larger than that of oil. Due to this, in the clamping apparatus of this embodiment, decrease in pressure is smaller than that in apparatuses using oil even if compressed air contained in the lock chamber 20 by the first holding valve 30 leaks little by little to the outside of the lock chamber 20, or even if the temperature of compressed air drops. It is therefore possible to maintain the lock state for a long period of time as compared to known clamping apparatuses including hydraulic cylinder devices. Moreover, decrease in pressure is smaller than that in apparatuses using oil even if compressed air contained in the release chamber 21 by the second holding valve 50 leaks little by little to the outside, or even if the temperature of compressed air drops. It is therefore possible to maintain the lock state for a long period of time as compared to known clamping apparatuses including hydraulic cylinder devices.

Figure 5:
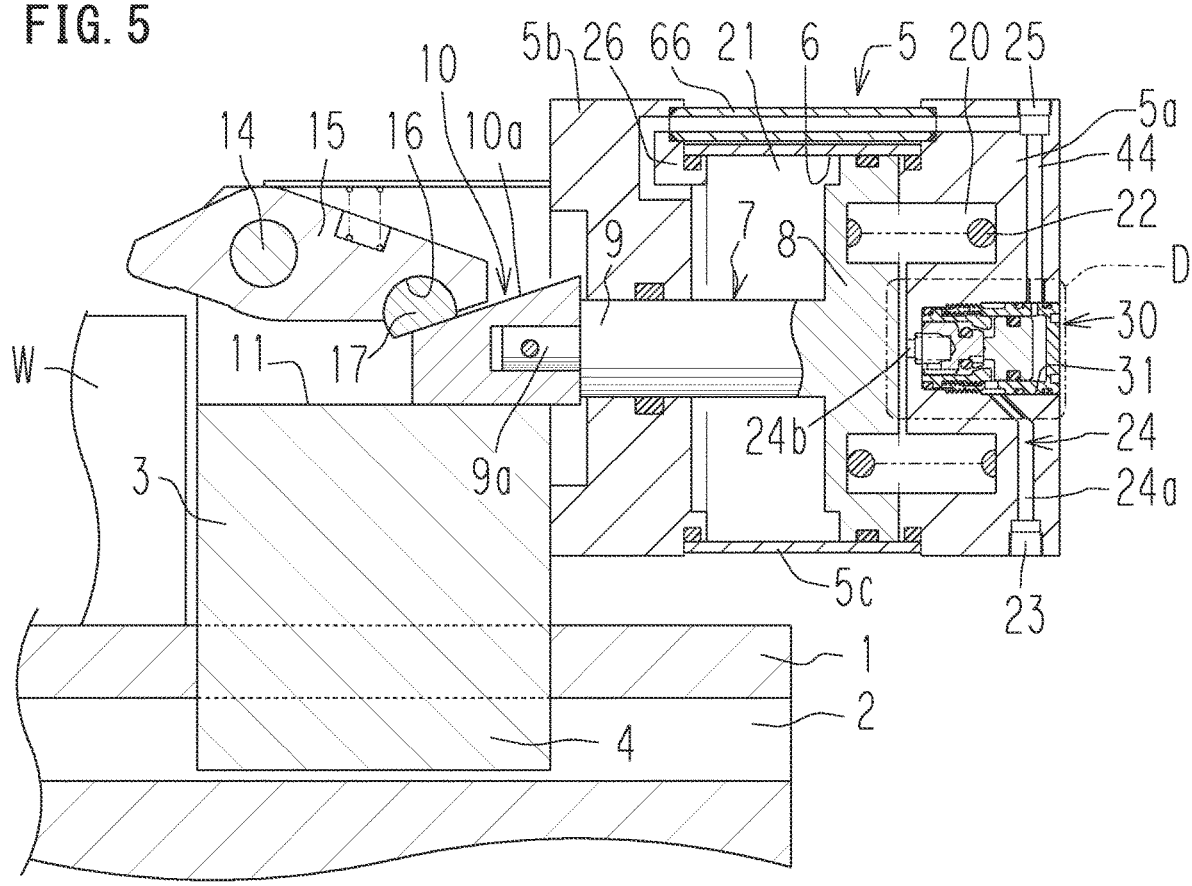
FIG. 5 shows a third embodiment of the present invention, and is a diagram similar to FIG. 1A.
Figure 6:
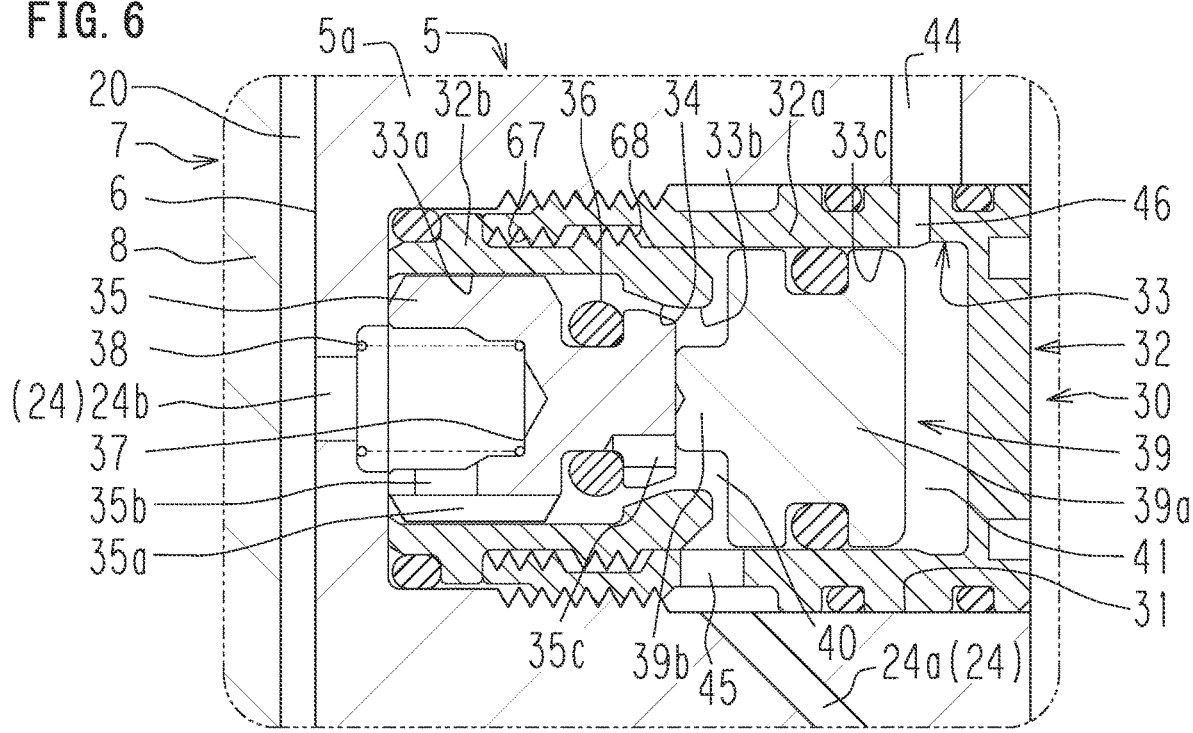
FIG. 6 is an enlarged view of a part D in FIG. 5, and is a diagram illustrating the first holding valve provided in the clamping apparatus.

FIG. 5 and FIG. 6 show a clamping apparatus of a third embodiment. The third embodiment is different from the above-described first embodiment in the following points.

In the clamping apparatus of the first embodiment, the first communication passage 44 is provided in a tubular barrel portion of the housing 5. To the contrary, the housing 5 of the clamping apparatus of the third embodiment includes: a substantially quadrangular right wall 5*a*; a substantially quadrangular left wall 5*b*; and a cylindrical barrel portion 5*c*. The right wall 5*a* and the left wall 5*b* each has a flange portion protruding outward (outward in the radial direction of the cylinder hole 6) relative to an outer peripheral surface of the barrel portion 5*c*. A tubular member 66 is hermetically attached between the flange portions of the walls 5*a* and 5*b*. A tubular hole of the tubular member 66 constitutes a part of the first communication passage 44.

FIG. 6 is an enlarged view of a part D in FIG. 5. The first casing 32 of the first holding valve 30 shown in FIG. 6 includes: the tubular casing main body 32*a*; and the tubular leading-end-side member 32*b* attached to the left end portion of the casing main body 32*a*. An internal thread portion 67 is provided on a left-end-side portion of an inner peripheral wall of the casing main body 32*a*, while an external thread portion 68 is provided on a right portion of an outer peripheral wall of the leading-end-side member 32*b*. The external thread portion 68 of the leading-end-side member 32*b* is screwed to the internal thread portion 67 of the casing main body 32*a*, and thereby the leading-end-side member 32*b* is connected to the casing main body 32*a*.

Furthermore, an outer peripheral portion of a right end portion of the first valve-closing spring 38 is fixed by pressing to an inner peripheral wall of the recess 37, which is provided on a left end wall of the first valve member 35. Due to this, when detaching the first holding valve 30 from the first attachment hole 31 of the housing 5, it is possible to detach the first holding valve 30 together with the first valve-closing spring 38 from the first attachment hole 31, without leaving the first valve-closing spring 38 in the first attachment hole 31. Furthermore, the above structure prevents a component of the first holding valve 30 from falling out after detaching the first holding valve 30.

Figure 7A:
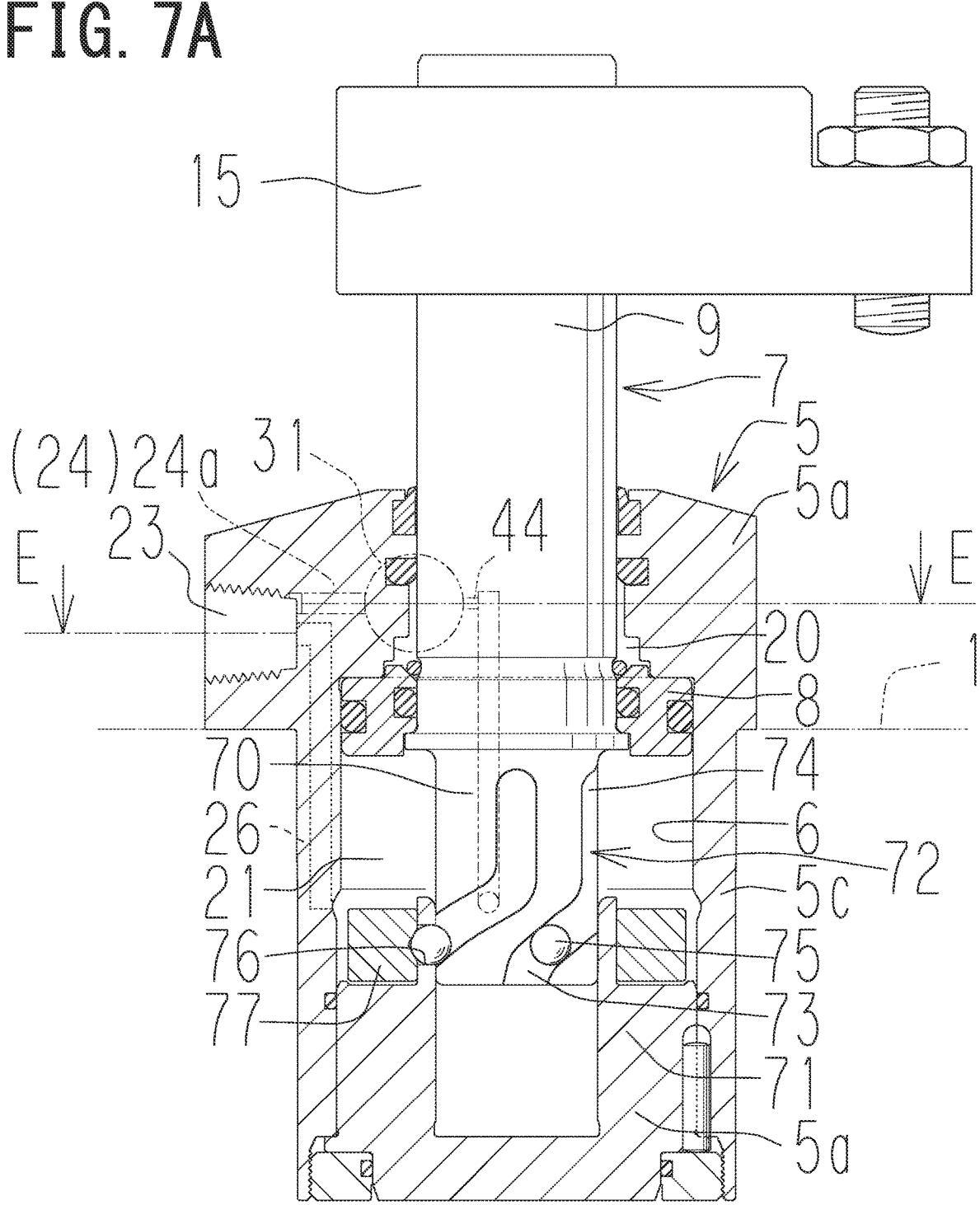
FIG. 7A shows a fourth embodiment of the present invention, and is a schematic cross-sectional view a rotary clamping apparatus.
Figure 7B:
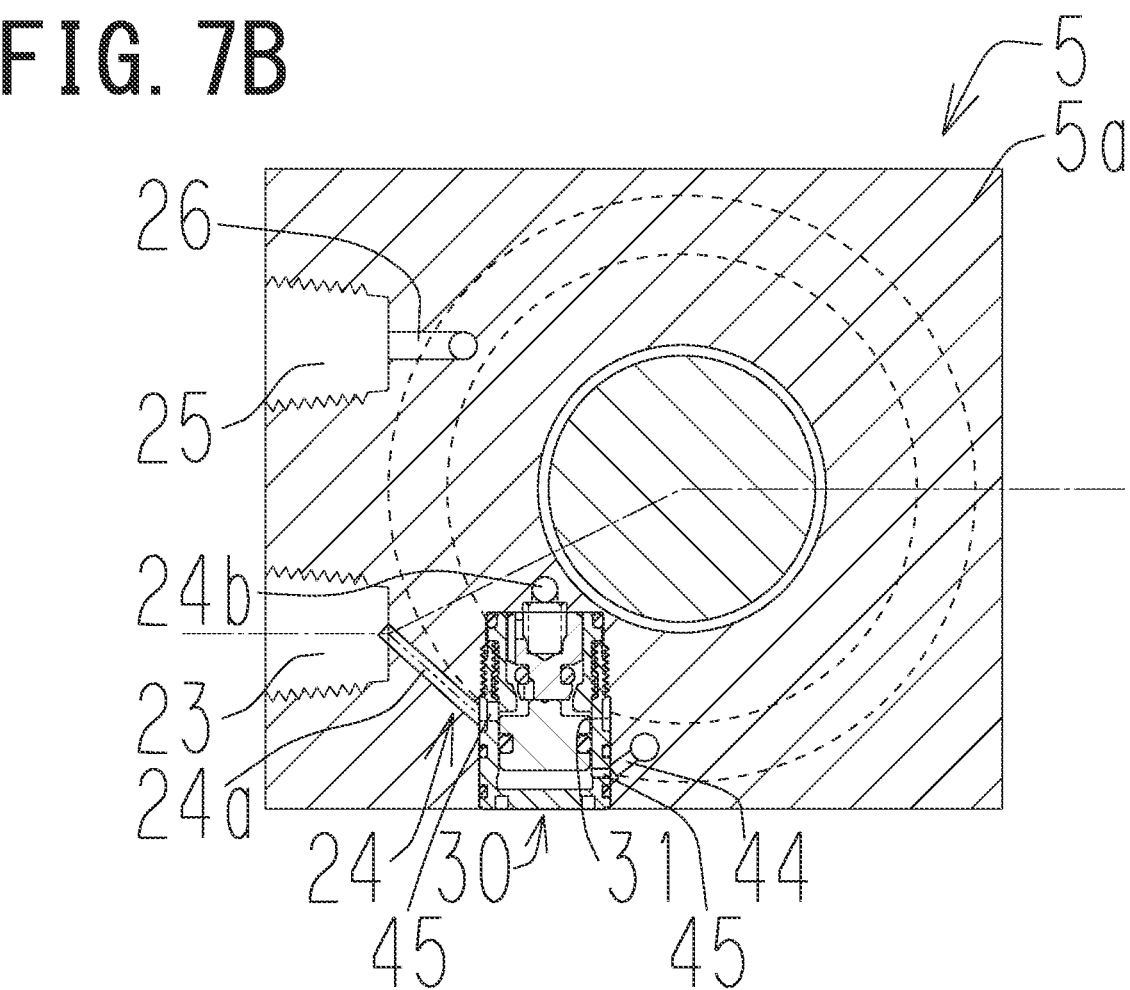
FIG. 7B is a cross section taken along a line E-E in FIG. 7A.

FIGS. 7A and 7B show a clamping apparatus of a fourth embodiment. The fourth embodiment is different from the above-described first embodiment in the following points.

The housing 5 of the clamping apparatus is bolted to an attachment hole, extending in the up-down direction and provided in the stationary stand 1. The cylinder hole 6 is provided inside the housing 5. The output member 7 is inserted in the cylinder hole 6 so as to be movable in the up-down direction (in its axial direction). The output member 7 includes a lower rod 70; the piston 8, and the output rod 9, which are provided from bottom to top in this order. The clamp arm 15 is attached to the leading end portion 9*a* of the output rod 9. The lower rod 70 is slidably supported by a support cylinder 71, which structures a part of a lower wall 5*a* of the housing 5.

The piston 8 of the output member 7 is hermetically inserted in the cylinder hole 6 so as to be movable in the up-down direction. In the cylinder hole 6, the lock chamber (first actuation chamber) 20 is provided above the piston 8. Meanwhile, the release chamber (second actuation chamber) 21 is provided below the piston 8.

The first supply and discharge port 23 is provided at an upper wall 5*b* of the housing 5. The first supply and discharge passage 24 which communicatively connects the first supply and discharge port 23 to the lock chamber 20 is provided in the housing 5. Through the first supply and discharge passage 24, compressed air is supplied to and discharged from the lock chamber 20. Furthermore, the second supply and discharge port 25 is provided at the upper wall 5*b* of the housing 5. The second supply and discharge passage 26 which communicatively connects the second supply and discharge port 25 to the release chamber 21 is provided in the housing 5. Through the second supply and discharge passage 26, compressed air is supplied to and discharged from the release chamber 21. The first holding valve 30 is provided at an intermediate portion of the first supply and discharge passage 24. The first holding valve 30 is configured to close and open the first supply and discharge passage 24.

A rotation mechanism is provided on an outer peripheral wall of the lower rod 70 of the output member 7 and on an inner peripheral wall of the support cylinder 71. The rotation mechanism is structured as follows.

Guide grooves 72 (in this embodiment, three guide grooves) are provided on the outer peripheral wall of the lower rod 70 at substantially equal intervals in its circumferential direction. Each guide groove 72 has a bow-like cross-sectional shape and includes a spiral rotation groove 73 and a linear groove 74 provided in this order from bottom to top. The rotation grooves 73 are arranged parallel to each other and the linear grooves 74 are also arranged parallel to each other.

An engagement ball 75 is fitted in each guide groove 72. Each engagement ball 75 is rotatably supported by a corresponding one of three through holes 76 provided through an upper portion of the inner peripheral wall of the support cylinder 71. A sleeve 77 is fitted over the three engagement balls 75 so as to be rotatable about its axis.

The first attachment hole 31 in which the first holding valve 30 is attached is provided in the upper wall 5*b* of the housing 5. The first communication passage 44 and the compressed-air-source-side passage 24*a* of the first supply and discharge passage 24, which are inclined relative to the axis of the first attachment hole 31, open onto an inner peripheral surface of the first attachment hole 31. The first communication passage 44 and the compressed-air-source-side passage 24*a* of the first supply and discharge passage 24 are formed through machining process, by inserting a cutting tool such as a drill into the first attachment hole 31 in respective directions inclined relative to the axis of the first attachment hole 31. That is, because the first communication passage 44 and the compressed-air-source-side passage 24*a* of the first supply and discharge passage 24 are formed by boring from the inner peripheral surface of the first attachment hole 31, the first communication passage 44 and the compressed-air-source-side passage 24*a* of the first supply and discharge passage 24 open with good positional precision in the first attachment hole 31. This allows these passages to respectively face the first through hole 45 and the second through hole 46 of the first holding valve 30 when the first holding valve 30 is attached to the first attachment hole 31, and therefore it is possible to prevent leakage of compressed air flowing in the passages.

The above-described first to fourth embodiments are changeable as follows.

The cylinder device of each of the first to third embodiments may be applied to a clamping apparatus configured so that the output member 7 is driven for clamping action in a direction toward the inside of the housing 5 as described in the fourth embodiment, instead of the clamping apparatus configured so that the output member 7 is driven for clamping action in a direction away from the housing 5.

The holding spring 22 may be attached in the release chamber 21 instead of the lock chamber 20.

Each of the sealing members attached to the grooves of the first valve member 35 and the second valve member 55 does not have to be an O ring and may be an X ring, U packing, or the like. The material of the sealing members is not limited to rubber or resin. The sealing members may be made of other material such as metal.

In the clamping apparatus of the second embodiment, the first holding valve 30 does not have to be provided.

Moreover, it is a matter of course that other changes or alterations can be made on the present invention within the scope of envisagement of one skilled in the art.

REFERENCE SIGNS LIST

5: housing; 5a: base end wall (right wall) 7: output member; 20: first actuation chamber (lock chamber); 21: second actuation chamber (release chamber); 22: holding spring; 24: first supply and discharge passage; 26: second supply and discharge passage; 30: first holding valve; 31: first attachment hole; 32: first casing; 33: first valve hole; 34: first valve seat; 35: first valve member; 38: first valve-closing spring; 39: first operation member; 41: first pressure-receiving chamber; 44: first communication passage; 50: second holding valve; 51: second attachment hole; 52: second casing; 53: second valve hole; 54: second valve seat; 55: second valve member; 58: second valve-closing spring; 59: second operation member; 61: second pressure-receiving chamber; 64: second communication passage.

The invention claimed is:

1. A pneumatic cylinder device comprising:
an output member (7) inserted in a housing (5) so as to be movable in its axial direction;
a first actuation chamber (20) provided in a base end side of the housing in the axial direction of the output member (7);
a second actuation chamber (21) provided in a leading end side of the housing in the axial direction of the output member (7);
a first supply and discharge passage (24) which is provided in the housing (5) and through which compressed air is supplied to and discharged from the first actuation chamber (20);
a second supply and discharge passage (26) which is provided in the housing (5) and through which compressed air is supplied to and discharged from the second actuation chamber (21); and
a first holding valve (30) provided to an intermediate portion of the first supply and discharge passage (24), the first holding valve (30) being configured to close and open the first supply and discharge passage (24), wherein
the first holding valve (30) includes:
a first casing (32) of the first holding valve (30), the first casing (32) being attached in a first attachment hole (31) provided in the housing (5);
a first valve hole (33) provided in the first casing (32);
a first valve seat (34) provided on an inner peripheral wall of the first valve hole (33);
a first valve member (35) inserted in the first valve hole (33) so as to be movable, the first valve member (35) being biased by a first valve-closing spring (38) toward the first valve seat (34);
a first operation member (39) hermetically inserted in a portion of the first valve hole (33) so as to be movable, the portion being opposite to the first valve member (35) across the first valve seat (34), the first operation member (39) being opposed to the first valve member (35) with a predetermined gap therebetween so as to be contactable with the first valve member (35);
a first pressure-receiving chamber (41) provided close to a first end surface of the first operation member (39), the first end surface being opposite from a second end surface thereof facing the first valve member (35); and
a first communication passage (44) which communicatively connects the second actuation chamber (21) to the first pressure-receiving chamber (41);
wherein a holding spring (22) is attached in the first actuation chamber (20) and between the output member (7) and a base end wall (5a) of the housing (5).

2. The pneumatic cylinder device according to claim 1, further comprising
a second holding valve (50) provided to an intermediate portion of the second supply and discharge passage (26), the second holding valve (50) being configured to close and open the second supply and discharge passage (26), wherein
the second holding valve (50) includes:
a second casing (52) of the second holding valve (50), the second casing (52) being attached in a second attachment hole (51) provided in the housing (5);
a second valve hole (53) provided in the second casing (52);
a second valve seat (54) provided on an inner peripheral wall of the second valve hole (53);
a second valve member (55) inserted in the second valve hole (53) so as to be movable, the second valve member (55) being biased by a second valve-closing spring (58) toward the second valve seat (54);
a second operation member (59) hermetically inserted in a portion of the second valve hole (53) so as to be movable, the portion being opposite to the second valve member (55) across the second valve seat (54), the second operation member (59) being opposed to the second valve member (55) with a predetermined gap therebetween so as to be contactable with the second valve member (55);
a second pressure-receiving chamber (61) provided close to a first end surface of the second operation member (59), the first end surface being opposite from a second end surface thereof facing the second valve member (55); and
a second communication passage (64) which communicatively connects the first actuation chamber (20) to the second pressure-receiving chamber (61).

3. A pneumatic cylinder device comprising:
an output member (7) inserted in a housing (5) so as to be movable in its axial direction;
a first actuation chamber (20) provided on in a base end side of the housing in the axial direction of the output member (7);
a second actuation chamber (21) provided in a leading end side of the housing in the axial direction of the output member (7);
a first supply and discharge passage (24) which is provided in the housing (5) and through which compressed air is supplied to and discharged from the first actuation chamber (20);
a second supply and discharge passage (26) which is provided in the housing (5) and through which compressed air is supplied to and discharged from the second actuation chamber (21); and
a second holding valve (50) provided to an intermediate portion of the second supply and discharge passage (26), the second holding valve (50) being configured to close and open the second supply and discharge passage (26), wherein
the second holding valve (50) includes:

a second casing (52) of the second holding valve (50), the second casing (52) being attached in a second attachment hole (51) provided in the housing (5);

a first valve hole (53) provided in the second casing (52);

a second valve seat (54) provided on an inner peripheral wall of the second valve hole (53);

a second valve member (55) inserted in the second valve hole (53) so as to be movable, the second valve member (55) being biased by a second valve-closing spring (58) toward the second valve seat (54);

a second operation member (59) hermetically inserted in a portion of the second valve hole (53) so as to be movable, the portion being opposite to the second valve member (55) across the second valve seat (54), the second operation member (59) being opposed to the second valve member (55) with a predetermined gap therebetween so as to be contactable with the second valve member (55);

a second pressure-receiving chamber (61) provided close to a first end surface of the second operation member (59), the first end surface being opposite from a second end surface thereof facing the second valve member (55); and a second communication passage (64) which communicatively connects the first actuation chamber (20) to the second pressure-receiving chamber (61).

* * * * *